Dec. 15, 1942.  N. F. ADAMSON  2,305,373
MULTIPLE ENGINE DRIVE
Filed Jan. 4, 1941  3 Sheets-Sheet 1

Inventor:
Nicholas F. Adamson.
By Davis, Lindsey, Smith & Shonts
Attys.

Dec. 15, 1942.     N. F. ADAMSON     2,305,373
MULTIPLE ENGINE DRIVE
Filed Jan. 4, 1941     3 Sheets-Sheet 2

Inventor:
Nicholas F. Adamson.
By Davis, Lindsey, Smith & Shonts
Attys.

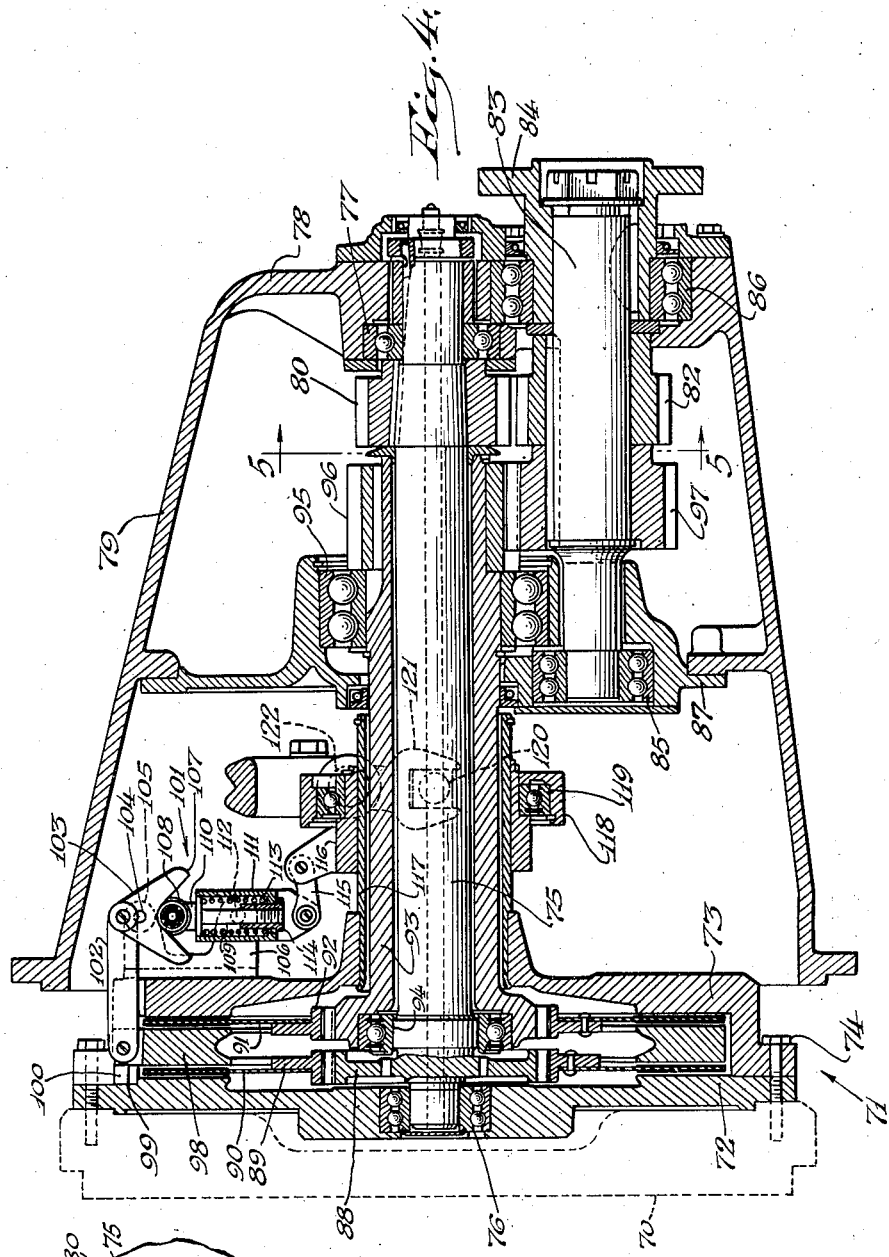

Patented Dec. 15, 1942

2,305,373

UNITED STATES PATENT OFFICE 2,305,373

MULTIPLE ENGINE DRIVE

Nicholas F. Adamson, Racine, Wis., assignor to Twin Disc Clutch Company, Racine, Wis., a corporation of Wisconsin Application January 4, 1941, Serial No. 373,085

12 Claims. (Cl. 74—389)

My invention relates to a multiple engine drive which incorporates in a compact structure facilities for transmitting to a single driven shaft the combined torque of a plurality of engines.

In devices of this character, important operating problems center in the desirability of synchronizing the engines and of eliminating torsional vibrations. Multiple engine drives which incorporate rigid power transmission elements, such as clutches, gears and the usual shafts, and which are employed in marine service, are particularly difficult in these respects with resulting undue wear and racking of the mechanism and the vessel's hull, especially during periods of sustained service. The provision of a relatively inexpensive construction for securing uniformity of speed of the parts of the drive which are coupled to the engine is another factor in these installations.

It is, therefore, one object of my invention to provide a gear box having speed reducing elements and multiple input connections for a plurality of engines and a single output connection for the load, wherein a hydraulic coupling is interposed as a power connection between at least one of the engines and the elements for the purpose of assisting in synchronizing the engines and in neutralizing the natural torsional vibrations of the unit.

A further object is to devise a gear box of the character indicated having facilities for concentrating the drive of a plurality of engines connected thereto in parallel in which certain economies in the cost of the power transmitting elements between the engines and the box is effected by providing in the box devices for reducing the speed of at least one of the engines.

A further object is to devise a gear box for marine service, wherein provision is made for ready replacement of the thrust bearing, without disturbing the alignment of the propeller shaft.

A further object is to devise a power transmission system which is characterized by a more economical utilization of reverse and reduction gears and which enables, by means of simple substitution, a variety of reduction gear ratios to be obtained.

These and further objects of my invention will be set forth in the following specification, reference being had to the accompanying drawings, and the novel means by which said objects are effectuated will be definitely pointed out in the claims.

In the drawings:

Fig. 4 is a sectional elevation of one of the reverse gear units shown diagrammatically in Fig. 1.

Fig. 5 is a section along the line 5—5 in Fig. 4.

Figure 1:
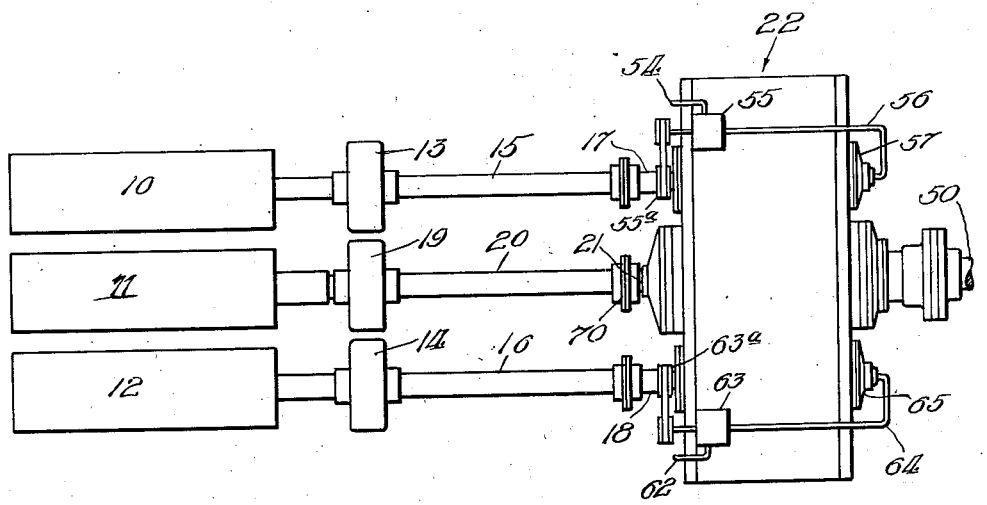
Figure 1 is a schematic plan view showing my improved drive as incorporating, in one form thereof, three engine units and an improved gear box for transmitting and reducing the drive to a single driven shaft.
Figure 3:
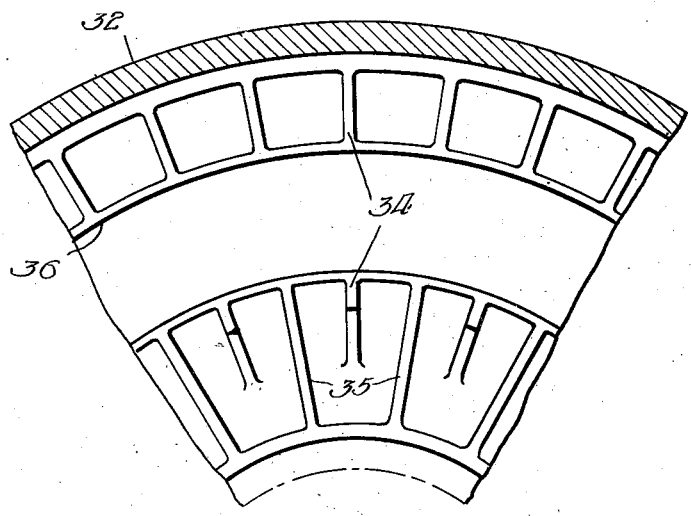
Fig. 3 is a fragmentary, sectional elevation of a portion of one of the runners shown in Fig. 2, looking in the direction of the arrow 3, and illustrating a characteristic relation of the vanes therein.

Referring to Fig. 1, the numerals 10, 11 and 12 designate engines, although it will be understood that in the more generic aspects of the invention, these engines are to be regarded as driving members, whether of the prime mover or other type. These engines are arranged side by side for parallel drive, the engines 10 and 12 transmitting power through reverse gear units 13 and 14, each having a 1:1 ratio, and connecting shafts 15 and 16 to input shafts 17 and 18, all respectively, while the engine 11 transmits power through a reverse and reduction gear unit 19 having a rtio of 6:1 and a connecting shaft 20 to an input shaft 21, all of the input shafts forming part of my improved gear box 22.

The mentioned gear ratios may be varied as desired, the 6:1 gear ratio in the unit 19 matching certain gear ratios contained in the gear box 22, as hereinafter described. Any standard form of reverse gears may be employed for the units 13 and 14, and the same condition holds true for the unit 19. A characteristic unit of this type is disclosed in United States Letters Patent No. 2,127,713, dated August 23, 1938, and will be presently described. In employing this patented structure, it will be understood that, for the units 13 and 14, the gear ratios would be adjusted to provide the required 1:1 ratio.

Figure 2:
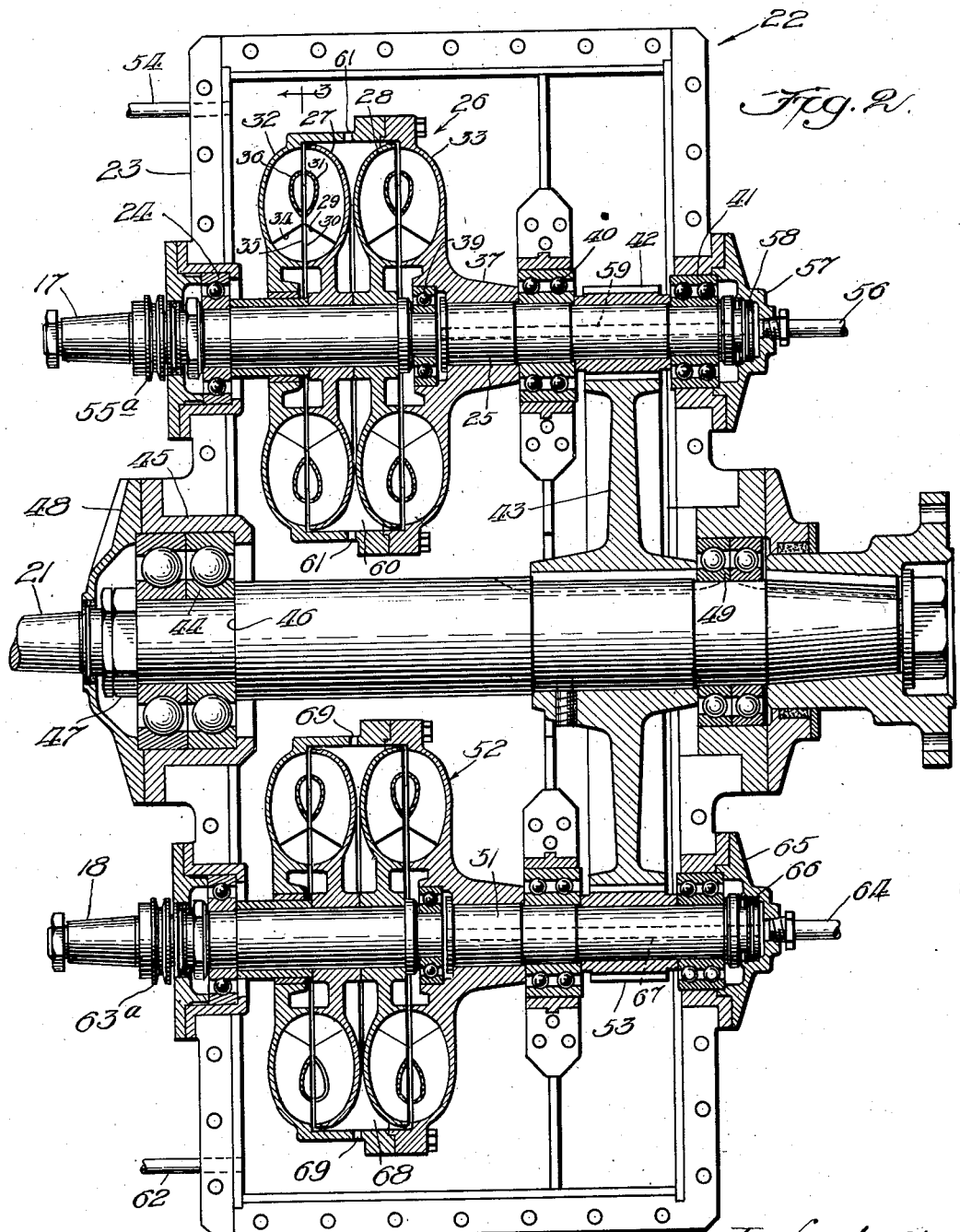
Fig. 2 is an enlarged, sectional plan view of the gear box shown in Fig. 1.

Referring to Fig. 2, the input shaft 17 extends within the housing 23 of the gear box 22, only the lower portion of this housing being illustrated in Fig. 2, and the shaft is intermediately journaled in a bearing 24 provided in the left wall of the housing. The driving connection between the shaft and an axially aligned intermediate shaft 25 is provided by a hydraulic coupling 26 comprising oppositely facing impellers 27 and 28 which are drivably secured to the shaft 15 and each of which is provided with vanes 29 and 30 that are connected by an annular shroud 31 in the customary manner to provide radial passages therein. The impeller 27 is located in facing and cooperative relation to a runner 32 which is bolted to a runner 33 that is disposed in cooperative relation to the impeller 28, each of the runners including vanes 34 and 35 which are connected by the customary shroud 36.

From the foregoing, it will be understood that the runners 31 and 32 completely house the impellers 27 and 28, with the impeller 27 and runner 32, and the impeller 28 and runner 33 respectively cooperating in the usual manner to provide a pair of fluid turbine transmission circuits.

The runner 33 is provided with a hub 37 which is keyed or otherwise drivably secured to the shaft 25. A portion of the hub 37 adjacent the left end of the shaft 25 is bored to receive a bearing 39 and journaled in this bearing is the inner end of the shaft 17. The shaft 25 is intermediately journaled in a bearing 40 provided in the housing 23 and also in a bearing 41 carried by the right wall of the housing, as viewed in Fig. 2. Between these bearings, a pinion 42 is secured to the shaft 25 which meshes with a gear 43 fast on the shaft 21, the ratio between the pinion 42 and gear 43 being 6:1.

The shaft 21 extends completely across the housing 23, the left end being journaled in a thrust bearing 44 carried in a cage 45 provided in the housing 23. The bearing 44 is held against the thrust shoulder 46 provided on the shaft 21 by means of a nut 47, and the thrust transmitted to the bearing 44 is exerted against a cover 48 that is bolted to the housing 23. The right end of the shaft 21 is journaled in a bearing 49 carried by the right wall of the housing 23 and the shaft extends without the housing for connection by a suitable coupling to a propeller shaft 50, which generally exemplifies a shaft that is connected to the load.

The input shaft 18 is connected to an intermediate shaft 51 by means of a hydraulic coupling 52, the internal arrangement of this coupling being the same as the coupling 26 and the journaling of the shafts 18 and 51 being respectively like that of shafts 17 and 25. A pinion 53, similar to the pinion 42, is secured to the shaft 51 and meshes with the gear 43, the ratio also being 6:1.

One of the important features of my improved gear box resides in the use of the lubricating oil, which is employed to lubricate the bearings and gears by splash, or by means of any desired means of pressure feed (not shown), as the operating fluid for the couplings 26 and 52. For this purpose, the lower portion of the housing 23 serves as a reservoir from which the oil may be moved in any desired manner to lubricate the bearings and gears. In order to supply oil to the coupling 26, a pipe 54 leads from the lower portion of the housing 23 to a gear pump 55 which may be conveniently mounted on top of the gear box 22 and driven from a pulley 55a on the shaft 17, and the oil delivered by this pump flows through a supply pipe 56 whose delivery end is mounted in a plate 57 that is secured to the housing 23 in covering relation to the right end of the shaft 25. Packing 58 surrounds the shaft 25 and prevents oil delivered by the pipe 56 from passing through the bearing 41 and confines the flow of this oil to movement through an axial passage 59 provided in the shaft 25. Oil pumped through this passage flows through the bearing 39 into the reservoir 60 of the coupling 26. One or more ports 61 are provided in the peripheral wall of the coupling 26, i. e., in the wall of the runner 32, for example, and, during operation of the coupling, the oil is continuously discharged through the ports 61 for return to the reservoir in the housing 23. When the engine 10 is operating, the oil is continuously delivered into the interior of the coupling and in order to insure that the coupling will be completely filled, it will be understood that the discharge capacity of the ports 61 is considerably below the capacity of the pump 55 so that after the coupling has once been filled, following a period of nonoperation, it remains in this condition during the operation of the engine. The ports 61 not only insure that the oil will be kept relatively cool, but obviate any necessity, in a coupling of the completely filled type, for external chambers to accommodate the expansion of the oil. Moreover, the coupling automatically deaerates itself during each filling and is automatically drained when out of operation.

The coupling 52 is supplied by a system identical with that above described, and which comprises a pipe 62 through which oil is withdrawn from the reservoir in the housing 23 by a pump 63, also mounted on the gear box 22 and driven from a pulley 63a on the shaft 18, and which delivers the oil through a pipe 64 into the interior of a cover plate 65, that is similar to the plate 57. As before, packing 66, surrounding the end of the shaft 51, confines movement of the oil through an axial passage 67 provided in the shaft 51. Oil delivered through this passage finally reaches, in the manner hereinabove described, the coupling reservoir 68 and from this reservoir the oil is centrifugally discharged during rotation of the coupling through one or more peripheral ports 69 provided in the wall of the coupling.

From the foregoing, it will be understood that the required speed reduction of the engines 10 and 12 is effected in the gear box 22 by means of the gears 42 and 43, and 53 and 43, respectively, while the speed reduction for the engine 11 which is directly connected to the shaft 21 is effected by the reverse and reduction gear unit 19. In stating that the gear ratio in the unit 17 is of the order of 6:1, it will be understood that this ratio is approximate and that the exact ratio should allow for the normal slip in the couplings 26 and 52 and hence should be equal to the net reduction ratio obtained through these couplings and the reduction gears in the gear box.

By providing for the speed reduction of the engines 10 and 12 within the gear box 22, it is possible to employ between these engines and the gear box relatively inexpensive reverse gear units having 1:1 ratio, thus materially reducing the over-all cost of the complete drive when compared with one of an equivalent arrangement having three units similar to unit 19. Any desired speed reduction may be obtained by suitably arranging the gear ratios so that my improved gear box is characterized by flexibility and a high degree of versatility.

In the disclosed arrangement, all three engines are effective in forward and reverse drives but, under certain conditions, it may be desirable to utilize the engine 11 only for forward drive and to eliminate this engine during reverse drive. Under these conditions, the reverse and reduction gear unit 19 would be replaced by a simple reduction gear unit having a ratio equal to the net reduction ratio through the hydraulic couplings and the reduction gears in the gear box, and also by a simple throwout clutch. Accordingly, during reverse drive, power connection between the engine 11 and the shaft 21 would be interrupted by the clutch.

One of the most important features of my invention resides in the ease with which the thrust bearing 44 may be replaced whenever desired. This replacement can be effected by removing the coupling 70 which connects the shafts 20 and 21, after which the cover plate 48 may be unbolted from the housing 23 and the bearing 44 thereafter slipped over the end of the shaft 21. This removal is effected without disturbing the alignment of the shafts 21 and 50, which, in marine service, is highly important.

In Fig. 4 is illustrated a reverse gear having a 1:1 ratio which might be used as either of the units 13 and 14. In this figure, the numeral 70 designates a flywheel or other rotating part of the engine 10 or 12 to which is drivably connected a clutch casing 71 composed of the separable, complementary parts 72 and 73 by means of bolts 74.

One end of a reverse drive shaft 75 is journaled in a bearing 76 carried by the casing part 72, while the opposite end is journaled in a bearing 77 mounted in the end wall 78 of the housing 79. A pinion 80 is keyed to the shaft 75 and through an idler gear 81, rotatably supported in the wall 78 (see Fig. 5), is drivably connected to a gear 82 keyed to a driven shaft 83 that extends through the wall 78 and may be flanged as at 84 for attachment to a shaft 15 or 16. The shaft 83 is journaled in bearings 85 and 86 mounted, respectively, in the walls 87 and 78.

Adjacent the casing part 72, the shaft 75 is provided with an externally toothed flange 88 which is in constant mesh with an internally toothed ring 89 that carries a friction disc 90. A similar disc 91, positioned adjacent the casing part 73, is secured to an internally toothed ring 92 which is in constant mesh with one end of an externally toothed, direct drive sleeve 93. The indicated sleeve end is supported out of contact with the shaft 75 by a bearing 94 carried by the shaft, while adjacent the opposite end, the sleeve is journaled in a bearing 95 mounted in the wall 87. Accordingly, the sleeve 93 may rotate freely and independently of the shaft 75. A pinion 96 is keyed to the sleeve 93 and meshes with a gear 97 secured to the shaft 83.

The sleeve 93 and shaft 75 transmit power to the respective gearing above described and their connection to the flywheel 70 are, respectively, provided by a direct drive clutch comprising the casing part 73 and friction disc 91, and a reverse drive clutch comprising the casing part 72 and friction disc 90. A common clamping plate 98 for these clutches is located between the discs 90 and 91 and driving engagement of the plate with the clutch casing is obtained by means of a plurality of circumferentially spaced lugs 99, only one of which is illustrated in Fig. 4, when extend outwardly from the periphery of the plate through similarly spaced slots 100 cut in the periphery of the casing part 73.

As shown in Fig. 4, the clutches are in neutral position and the distance between the opposed faces of the casing parts 72 and 73 is such that when the plate 98 is in the intermediate position shown, the discs 90 and 91 may freely shift axially to positions free of driving contact with the faces of the plate and the casing parts 72 and 73.

The clutches are selectively engaged by a plurality of operators designated generally by the numeral 101, only one being shown in Fig. 4. These operators are equispaced around the axis of the clutches and as many may be employed as the conditions of operation require. Each operator comprises a link 102, one end of which is pivotally secured to a lug 99 while the opposite end is pivotally connected to one arm of a lever 103 that is intermediately pivoted at 104 on an outer arm 105 of a bracket 106 that is fastened to the casing part 73. Radially inward of the pivot pin 104, the lever 103 is provided with a pair of divergent arms 107 which are symmetrically disposed in perpendicular relation to each other on opposite sides of a radius through the pin 104 when the plate 98 is in neutral position.

A peripherally grooved roller 108, disposed between and in guiding and bearing relation to the arms 107, is rotatable on the outer end of a stem 109 which includes a flange 110 slidable within a spring cup 111. This cup is pivoted on a pin 112 mounted in an inner arm of the bracket 106. A helical spring 113 encircles the stem 109 between the flange 110 and the bottom of the cup 111 and acts to maintain the roller 108 in contact with both arms 107 when the operator occupies the position shown in Fig. 4, or with either arm depending upon which clutch is engaged. The inner end of the stem 109, radially considered, is threaded into a shouldered sleeve 114 that is slidable through the inner end of the cup 111, the sleeve shoulder abutting the cup and limiting outward, radial movement of the stem.

The inner end of the cup is connected by a link 115 to a sleeve 116 that is slidable along a tubular extension 117 carried by the casing part 73. A collar 118 encircles and is connected by a ball bearing 119 with the sleeve 116 and is provided with trunnion pins 120. These pins are engaged by arms 121 provided on an operating lever that is pivoted on a shaft 122 externally rocked by a lever (not shown).

The foregoing reverse gear is substantially identical with that described and claimed in the above noted patent, except for certain changes, unimportant so far as this application is concerned, in the gear arrangement and arising from the fact that, in the patented structure, the shaft corresponding to the shaft 75 transmits direct drive, while the counterpart of the sleeve 93 transmits reverse drive.

During operation, when the cup 111 is rocked counterclockwise, the plate 98 is shifted to the right to engage the direct drive clutch and transmit power through the pinion 96 and gear 97 to the shaft 83, and when rocked clockwise, the reversing clutch is engaged to thereby transmit power through the pinion 80, idler 81 and gear 82 to the shaft 83.

As indicated in Fig. 4, the gear ratios for direct and reverse drive is 1:1 and the gear illustrated may thus be used for the units 13 and 14. The same gear may also be employed for the unit 19 by changing the gear ratio to 6:1.

I claim:

1. In a power transmitting system, the combination of a pair of driving members, a driven shaft operable at a lower speed than the members, and means for connecting the members and shaft comprising speed reducing mechanism connecting one of the members and shaft, reverse gear means having a 1 to 1 ratio connecting said one member and mechanism, and reverse and reduction gear means having a reduction capacity equal to the mechanism connecting the other member and shaft.

2. In a power transmitting system, the combination of a pair of driving members, a driven shaft operable at a lower speed than the members, means connecting one of the members to the shaft comprising reverse gear means having a 1 to 1 ratio, a hydraulic coupling and speed reducing mechanism, and means for connecting the other member to the shaft comprising reverse and reduction gear means having a reduction capacity equal to the mechanism.

3. In a power transmitting system, the combination of a pair of driving members, a driven shaft operable at a lower speed than the members, means connecting one of the members to the shaft comprising reverse gear means having a 1 to 1 ratio, a hydraulic coupling and speed reducing mechanism, and means for connecting the other member to the shaft comprising reverse and reduction gear means having a reduction capacity equal to the mechanism and an intermediate shaft interposed between the last-named gear means and the driven shaft having secured thereto a gear forming part of the mechanism.

4. In a power transmitting system, the combination of three driving members, a driven shaft operable at a lower speed than the members, and means for connecting the members and shafts comprising speed reducing mechanisms connecting the two outermost members to the shaft, reverse gear means having a 1 to 1 ratio connecting the outermost members and mechanisms, respectively, and reverse and reduction gear means having a reduction capacity equal to the mechanisms connecting the other member and shaft.

5. In a power transmitting system, the combination of three driving members, a driven shaft operable at a lower speed than the members, means connecting each outermost member to the shaft comprising reverse gear means having a 1 to 1 ratio, a hydraulic coupling and a speed reducing mechanism, and means for connecting the other member to the shaft comprising reverse and reduction gear means having a reduction capacity equal to the mechanisms.

6. In a power transmitting system, the combination of a pair of driving members, a driven shaft operable at a lower speed than the members, means connecting one of the members to the shaft comprising reversing mechanism, a hydraulic coupling and speed reducing mechanism, and means for connecting the other member to the shaft comprising reverse and reduction gear means having a reduction capacity equal to the mechanism.

7. In a power transmitting system, the combination of a pair of driving members, a driven shaft operable at a lower speed than the members, means connecting one of the members to the shaft comprising reversing mechanism, a hydraulic coupling and speed reducing mechanism, and means for connecting the other member to the shaft comprising reverse and reduction gear means having a reduction capacity equal to the mechanism and an intermediate shaft interposed between the last named gear means and the driven shaft having secured thereto a gear forming part of the mechanism.

8. In a power transmitting system, the combination of three driving members, a driven shaft operable at a lower speed than the members, means connecting each outermost member to the shaft comprising reversing mechanism, a hydraulic coupling and a speed reducing mechanism, and means for connecting the other member to the shaft comprising reverse and reduction gear means having a reduction capacity equal to the mechanism.

9. In a power transmitting system, the combination of a pair of driving members, a driven shaft operable at a lower speed than the members, means connecting one of the members to the shaft comprising reversing mechanism and speed reducing mechanism, and means connecting the other member to the shaft comprising reverse and reduction gear means having a reduction capacity equal to the mechanism.

10. In a power transmitting system, the combination of three driving members, a driven shaft operable at a lower speed than the members, means connecting each outermost member to the shaft comprising reversing mechanism and a speed reducing mechanism, and means for connecting the other member to the shaft comprising reverse and reduction gear means having a reduction capacity equal to the mechanisms connecting the other member and shaft.

11. In a power transmitting system, the combination of a pair of driving members, a driven shaft operable at a lower speed than the members, means connecting one of the members to the shaft comprising reversing mechanism and speed reducing mechanism, and means connecting the other member to the shaft comprising reverse and reduction gear means having a reduction capacity equal to the mechanism and an intermediate shaft interposed between the last named gear means and the driven shaft having secured thereto a gear forming part of the mechanism.

12. In a power transmitting system, the combination of a pair of driving members, a driven shaft operable at a speed different from the members, means connecting one of the members to the shaft comprising reversing mechanism and mechanism for converting the speed of said one member to that of the shaft, and reverse and speed conversion means having a speed conversion capacity equal to the speed converting mechanism connecting the other member and shaft.

NICHOLAS F. ADAMSON.